March 6, 1928.  
H. G. FRANCIS  
GLUE SPREADER  
Filed Feb. 14, 1927  
1,661,174  
2 Sheets-Sheet 1
Fig.1.
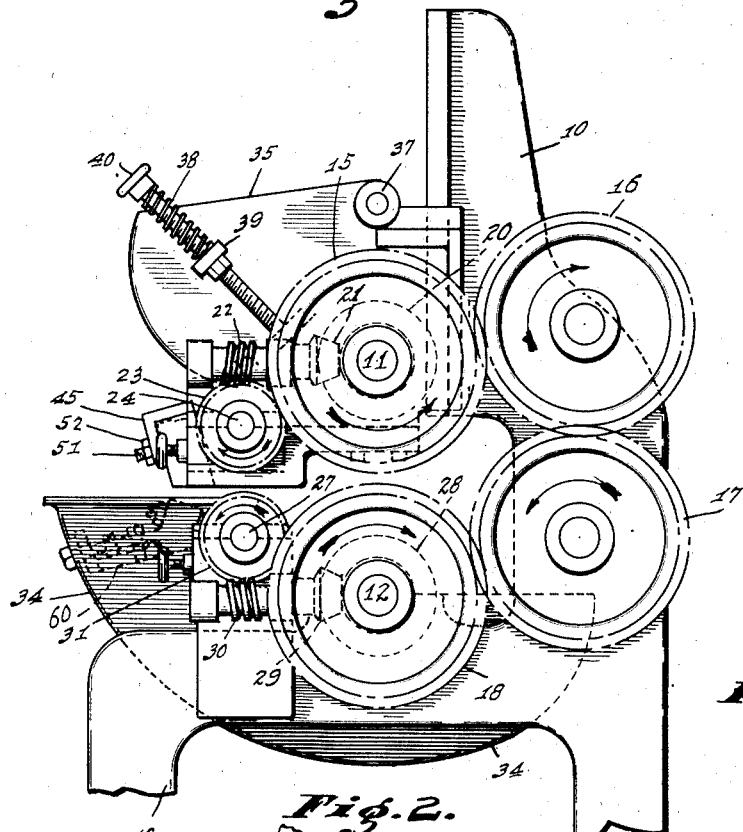
Fig.2.
Fig.7.
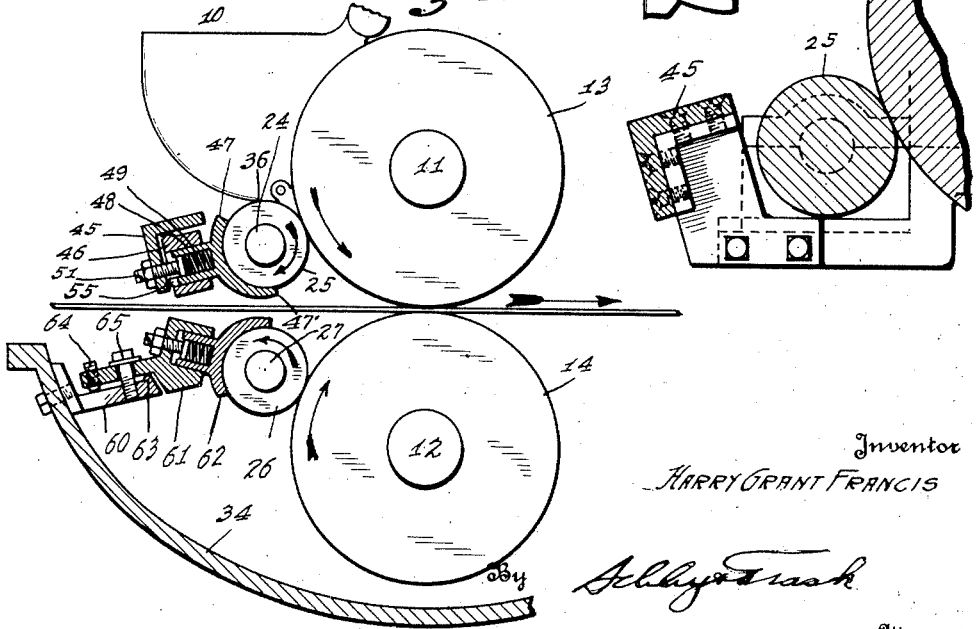
Inventor  
HARRY GRANT FRANCIS  
By  
Attorneys

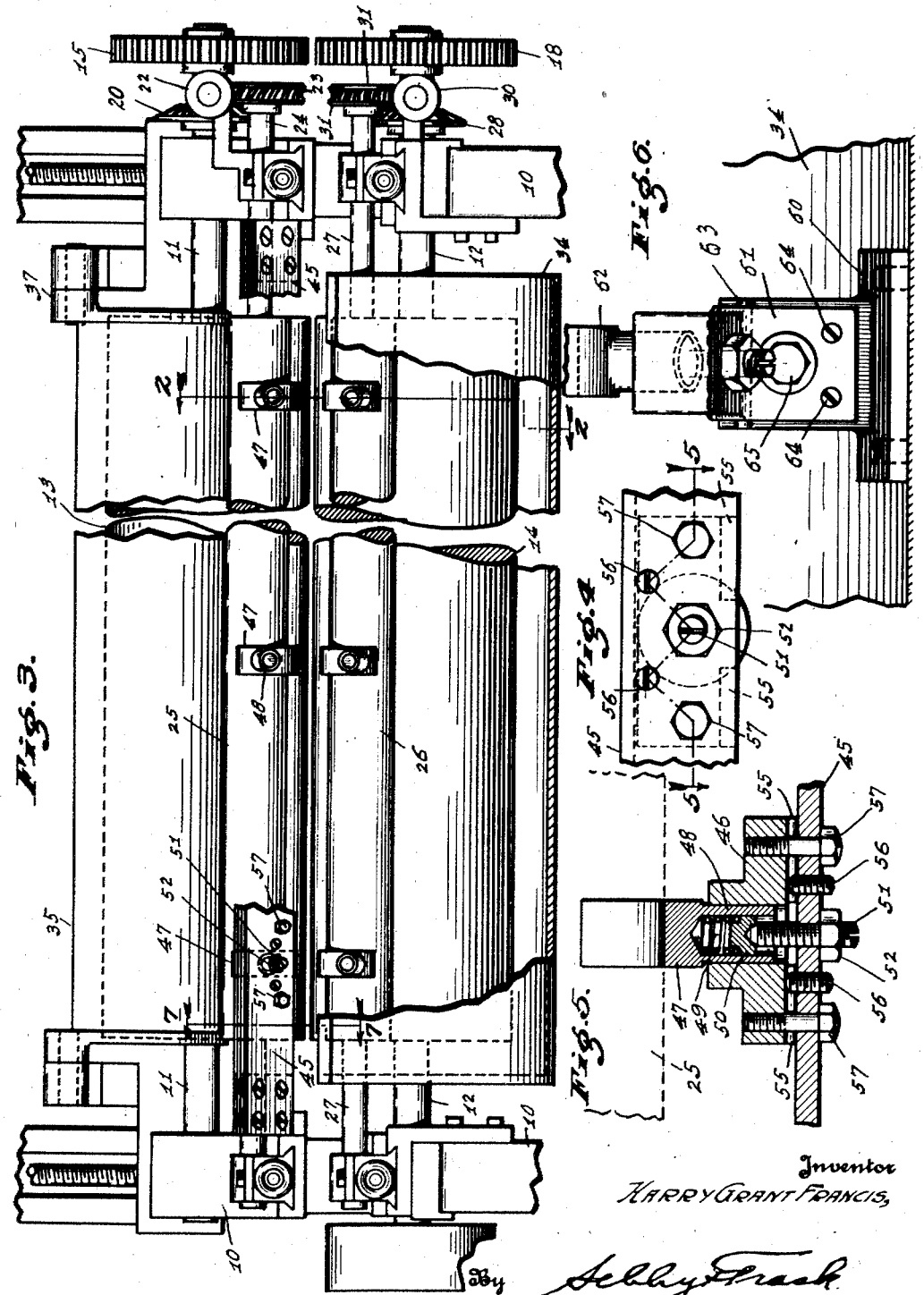

Patented Mar. 6, 1928.

1,661,174

UNITED STATES PATENT OFFICE.

HARRY G. FRANCIS, OF RUSHVILLE, INDIANA.

GLUE SPREADER.

Application filed February 14, 1927. Serial No. 167,989.

It is the object of my invention to improve the construction and operation of a glue spreading machine of the type shown and described in my prior Patent No. 1,464,813 issued to me on August 14, 1923. More specifically, it is my object to provide in such a machine for the application of a glue layer of uniform thickness and to prevent separation of the scraper rolls from the spreader rolls due to lack of stiffness in the former.

I accomplish the above objects by providing at spaced points along the length of each scraper roll a support which will maintain such scraper roll at a uniform distance from its associated spreader roll throughout the length of the scraper roll.

The accompanying drawings illustrate my invention: Fig. 1 is an end elevation of my glue spreading machine; Fig. 2 is a vertical section through the rolls on the line 2—2 of Fig. 3; Fig. 3 is a front elevation of the machine with parts thereof broken away; Fig. 4 is a fragmental front elevation of the bar on which supports for the upper scraper roll are mounted; Fig. 5 is a section on the line 5—5 of Fig. 4; Fig. 6 is a plan view of one of the supports for the lower scraper roll; and Fig. 7 is a fragmental vertical section on the line 7—7 of Fig. 3.

My glue spreading machine comprises a frame 10 in which are rotatably supported in vertically spaced relation two longitudinally extending shafts 11 and 12 on which are respectively mounted an upper spreader roll 13 and a lower spreader roll 14. The two shafts are interconnected as by means of gears 15, 16, 17, and 18, so that they may be driven in opposite directions from a suitable source of power. Rotatable with the shaft 11 is a bevel gear 20 which meshes with a bevel pinion 21 to drive a worm 22. The worm 22 meshes with a worm wheel 23 carried by a shaft 24 which also supports the upper scraper roll 25. A lower scraper roll 26 is similarly mounted on a shaft 27 which is arranged to be driven from the shaft 12 through a bevel gear 28, bevel pinion 29, worm 30, and worm wheel 31.

The lower spreader roll 14 is located in a lower glue tank 34 which is supported from the frame 10 of the machine and which contains glue into which the lower spreader roll 14 extends. An upper glue tank 35 is located above the upper spreader roll 13 and the upper scraper roll 25 which, in effect, form the bottom of such tank. The front wall of the upper tank 35 is conveniently curved with its lower edge 36 contacting firmly with the upper scraper roll 25. Desirably, the tank 35 is pivotally supported from the frame 10 by means of trunnions 37 in order that it may be readily moved upward to permit cleaning. To hold the lower edge of the front wall of the tank 35 in firm contact with the lower scraper roll 25, I may provide at each end of the tank 35 a spring 38 which acts between an abutment 39 on the tank and the head 40 of an adjusting screw mounted in a suitable part of the frame 10 as shown in Fig. 1.

The construction so far described is substantially that shown in my prior patent referred to above. This machine, while operating fairly satisfactorily, has had the disadvantage that the scraper rolls 25 and 26, which because of their relatively small diameter and great length are appreciably flexible, may spring away from their associated spreader rolls and permit the passage of a glue layer which is considerably thicker near its center than at its ends. To prevent the scraper rolls from springing away from their respective spreader rolls, I provide at spaced points along such scraper rolls supports which will hold the scraper rolls in the desired relation with the spreader rolls.

To provide for supporting the upper scraper roll 25, at points intermediate its length, I support from the frame 10 of the machine a bar 45, conveniently of angle iron, which extends parallel to the scraper roll 25. At spaced intervals along this bar, I mount supports 46 which carry curved shoes 47 engaging the roll 25. I have found it desirable to provide the shoes 47 with arcuate lips 47' which extend circumferentially of the scraper roll 25 for a considerable distance oppositely to the direction of rotation of the scraper roll and prevent such scraper roll from being displaced by the action of the spreader roll 13. Preferably, the shoes 47 are provided with outwardly extending hollow bosses 48 which are slidably received within holes in the respective supports 46. Within each of the bosses 48 is located a coil spring 49 which acts between the shoe 47 and a spring-stop 50 and holds the shoe 47 in engagement with the roll 25. The spring-stop 50 is preferably made adjustable as by means of the adjusting screw 51 and lock nut 52.

I have found it desirable to mount the supports 46 on the bar 45 in such a manner that their angular position may be varied. To this end, each support 46 may be provided along its lower edge with a lip 55 which rests against the inner face of the bar 45. Above the lip 55 I mount in the bar 45 one or more adjusting screws 56 which engage the outer face of the support 46, and between the lip 55 and adjusting screws 56 I provide clamping screws 57 by means of which the support 46 is held in place on the bar 45. It will be evident that the angular position of the supports 46 may be varied by adjustment of the screws 56 and 57.

To provide for the support of the lower scraper roll 26, I mount at longitudinally spaced points along the wall of the lower glue tank 34 carriers 60 on which are mounted supports 61 for the scraper roll 26. The supports 61 are provided with shoes 62 which are curved to conform to the shape of the scraper roll 26 and are spring-pressed against such roll. Each of the shoes 62 may be provided with an extending lip 62' similar to the lips 47' on the shoes 47.

Preferably, each support 61 is so mounted on its associated carrier 60 that its angular position may be varied. To this end, each carrier 60 may be provided with an upwardly projecting lip 63 which engages the support 61. At a point spaced from the lip 63, the support 61 is provided with one or more adjusting screws 64 the point of which engages the upper face of the carrier 60. Between the lip 63 and the adjusting screw 64, I provide a clamping screw 65 by which the support 61 is secured to the carrier 60. It will be evident that the angular position of the support 61 may be changed by adjustment of the screws 64 and 65.

With the construction described, the shoes 47 and 62 can be adjusted so as to vary their angular position as well as their distance from the spreader rolls. By proper adjustment of the shoes, the scraper rolls 25 and 26 may be supported at points intermediate their length so that the glue film which adheres to each spreader roll will be of substantially uniform thickness.

My invention is primarily adapted to apply glue to material of various kinds. I have referred to it in this application as a glue spreader. By this, I do not mean to limit the use of my invention, as it will be evident that it is equally adaptable for use in the application of rubber cement or other adhesives, or of any liquid substances.

I claim as my invention:

1. In a device for applying glue to material, the combination of a spreader roll, means for applying glue to said roll, a scraper roll for limiting the thickness of the glue film adhering to said spreader roll, journals in which said scraper roll is rotatably mounted, and means for supporting said scraper roller at one or more points between said journals, said supporting means including one or more shoes spring-pressed against said scraper roll.

2. In a device for applying glue to material, the combination of a spreader roll, means for applying glue to said roll, a scraper roll for limiting the thickness of the glue film adhering to said spreader roll, journals in which said scraper roll is rotatably mounted, and means for supporting said scraper roller at one or more points between said journals, said supporting means including one or more shoes spring-pressed against the face of said scraper roll, the roll-engaging faces of said shoes being concavely curved to conform to the curvature of said scraper roll.

3. In a device for applying glue to material, the combination of a spreader roll, means for applying glue to said roll, a scraper roll for limiting the thickness of the glue film adhering to said spreader roll, journals in which said scraper roll is rotatably mounted, and means for supporting said scraper roller at one or more points between said journals, said supporting means including one or more shoes adapted to bear against said scraper roll, spring means for holding said shoes against said scraper roll, and means for varying the pressure exerted by said spring means.

4. In a device for applying glue to material, the combination of a spreader roll, means for applying glue to said roll, a scraper roll for limiting the thickness of the glue film adhering to said spreader roll, journals in which said scraper roll is rotatably mounted, and means for supporting said scraper roller at one or more points between said journals, said supporting means including one or more shoes adapted to bear against said scraper roll, adjustable supports for said shoes, and spring means acting between each shoe and its associated support for holding such shoe against said scraper roll.

5. In a device for applying glue to material, the combination of a spreader roll, means for applying glue to said roll, a scraper roll for limiting the thickness of the glue film adhering to said spreader roll, journals in which said scraper roll is rotatably mounted, and means for supporting said scraper roller at one or more points between said journals, said supporting means including one or more shoes adapted to bear against said scraper roll, adjustable supports for said shoes, and spring means acting between each shoe and its associated support for holding such shoe against said scraper roll, and means for varying the pressure exerted by said spring means.

6. In a device for applying glue to material, the combination of a spreader roll, means for applying glue to said roll, a scraper roll for limiting the thickness of the glue film adhering to said spreader roll, journals in which said scraper roll is rotatably mounted, and means for supporting said scraper roller at one or more points between said journals, said supporting means including one or more shoes adapted to bear against the face of said scraper roll and extending circumferentially thereof sufficiently far to prevent lateral displacement of said scraper roll.

7. In a device for applying glue to material, the combination of a spreader roll, means for applying glue to said roll, a scraper roll for limiting the thickness of the glue film adhering to said spreader roll, journals in which said scraper roll is rotatably mounted, and means for supporting said scraper roller at one or more points between said journals, said supporting means including one or more shoes spring pressed against the face of said scraper roll and extending circumferentially thereof sufficiently far to prevent lateral displacement of said scraper roll.

In witness whereof, I have hereunto set my hand at Indianapolis, Indiana, this 11th day of February, A. D. one thousand nine hundred and twenty-seven.

HARRY G. FRANCIS.